United States Patent [19]

Arditty et al.

[11] Patent Number: 4,509,968
[45] Date of Patent: Apr. 9, 1985

[54] DEVICE FOR PROVIDING A DRAWN FIBER-LIKE OBJECT WITH A HELICAL STRUCTURE

[75] Inventors: Hervé Arditty; Yannic Bourbin; Jacques Dubos; Francis Gautnier; Philippe Graindorge, all of Paris, France

[73] Assignee: Thomson - CSF, France

[21] Appl. No.: 424,293

[22] Filed: Sep. 27, 1982

[30] Foreign Application Priority Data

Nov. 3, 1981 [FR] France .................. 81 20595

[51] Int. Cl.³ .............................................. C03B 37/03
[52] U.S. Cl. ........................................ 65/10.1; 65/13; 425/319; 425/321; 425/322
[58] Field of Search ............... 65/13, 10.1; 425/322, 425/319, 321

[56] References Cited

U.S. PATENT DOCUMENTS

| | | | |
|---|---|---|---|
| 2,576,670 | 11/1951 | Cohen | 425/322 X |
| 3,010,146 | 11/1961 | Warther | 65/10.1 X |
| 3,900,302 | 8/1975 | Langlois | 65/10.1 X |
| 4,163,370 | 8/1979 | Kurth | 65/13 |
| 4,427,717 | 1/1984 | Gauthier | 65/3.11 X |

FOREIGN PATENT DOCUMENTS 3010005 2/1981 Fed. Rep. of Germany .

OTHER PUBLICATIONS

"Navy Technical Disclosure Bulletin", vol. 5, No. 12, Dec. 1980, (pp. 8–12).

Primary Examiner—Kenneth M. Schor
Attorney, Agent, or Firm—Cushman, Darby & Cushman

[57] ABSTRACT

The invention relates to a process making it possible to produce a drawn object having a chiralic structure. This production process consists of subjecting the object to torsion during its drawing and simultaneously to hardening making it possible to fix part of the thus obtained torsional stresses in the structure.

12 Claims, 4 Drawing Figures

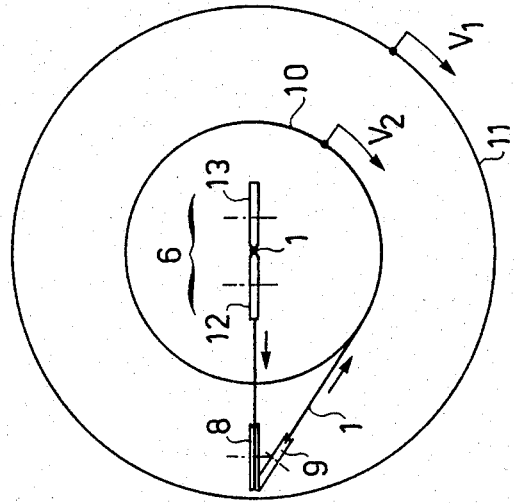
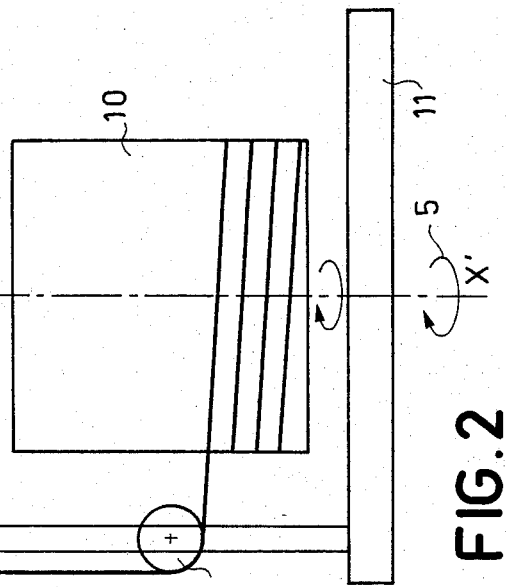
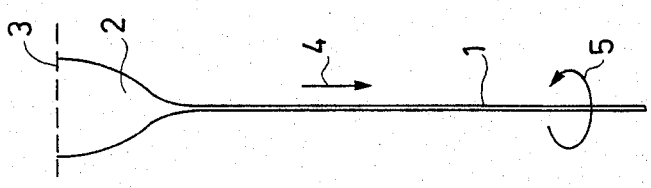

DEVICE FOR PROVIDING A DRAWN FIBER-LIKE OBJECT WITH A HELICAL STRUCTURE

BACKGROUND OF THE INVENTION

The present invention relates to a process for obtaining an object drawn from a softened material source having a chiralic structure and to a device for performing this process.

This drawn object has a random cross-section and is, for example, an optical fibre. This is the case which will be considered in a non-limitative manner throughout the remainder of the present patent application.

Monomodal fibres produced for telecommunications generally have a little linear birefringence and circular birefringence. As a result these fibres neither retain the linear polarization, nor the circular polarization.

It is possible to give the fibre a high level of linear birefringence by breaking the circular symmetry to the benefit of the planar symmetry.

It is also possible to consider a reverse method consisting of introducing a circular birefringence or rotatory power of a high level in order to retain the circular polarization.

One way of producing this circular polarization consists of subjecting the glass fibre to a static torsional stress, e.g. applied externally by twisting between its two ends. One effect of the twisting of the fibre is to introduce a circular birefringence therein.

BRIEF SUMMARY OF THE INVENTION

The present invention relates to a production process of the type permitting a twisting state resulting from a torsional stress applied in a temporary manner. It makes it possible to store a helical structure or a chiralic structure of the said fibre.

The most conventional glassmaking procedures for producing an optical fibre consist of melting the starting substances, refining them and forming them into a fibre by drawing out the molten material. However, instead of starting from a molten state, preference is usually given to starting with a preform or blank which, to within a homothetic transformation, offers the geometry of the desired fibre, which it is then merely necessary to draw. Thus, in the system of doped silica glass fibres, one way of producing the fibre which has already been produced consists of rotating the blank at a very high speed in the drawing furnace.

However, this process has numerous disadvantages. As the blank is not a perfect cylinder, its rotation in the molten viscous state leads to the creation of defects in the fibre. On rotating the blank, the centrifugal force leads to the soft material attracted towards the outside undergoing a lateral deformation. Thus, the blank which is a 40 to 100 cm long glass bar has a significant weight. In addition, it also has a significant precession effect. Thus, the fault spectrum obtained for the fibre is not the sought spectrum.

The processes for producing fibres, which do not use blanks, e.g. the double crucible process in which a double crucible is used for producing an optical fibre, whereby the envelope glass is placed in the outer part and the core glass in the inner part, said starting materials being melted, refined and drawn, cannot take advantage of the process consisting of rotating the blank in view of the difficulties which would be encountered in rotating the double crucible.

To obviate these disadvantages it is not the blank, but the fibre which is rotated. It is therefore the object of the present invention to provide a fibre having qualities making it possible to retain the circular polarization. Consequently the production process according to the invention consists of twisting the fibre during its formation, followed by hardening, which makes it possible to fix part of the thus obtained torsional stresses in the structure, which destroys the right-left symmetry of the conventional fibre. In this way a chiralic fibre is obtained. As a result of the process of the invention, the released part of the shear stress, which does not participate in the fixed stress, uniformizes the rotational symmetry.

In addition, this process makes it possible to produce fibres by a means applicable to all production technologies, such as the blank and double crucible processes. However, the present invention also applies to any object which it is desired to draw and twist and where there is a wish to fix the state of the object obtained in this way.

The present invention therefore specifically relates to a process for obtaining an object with a chiralic structure resulting from drawing from a softened material source, comprising a stage consisting of simultaneously drawing the object from a softened material source fixed by its first end to a frame, the rotation, the axis coinciding with the drawing axis of the object, of the said object in its solidified part so as to transmit the thus produced torsion couple from the solidified part of the object to the second end of the softened material source and the hardening by cooling of the section of the object between the second end of the source and the solidified part of the object of the stress state induced by twisting.

The invention also relates to a device for performing this process.

BRIEF DESCRIPTION OF THE DRAWINGS

The invention is described in greater detail hereinafter relative to non-limitative embodiments of the invention, wherein show:

FIG. 1 diagrammatically the process according to the invention.

FIGS. 2 and 3 a side view and a projection view of the device according to the invention.

DETAILED DESCRIPTION OF THE PREFERRED EMBODIMENTS

Figure 4:
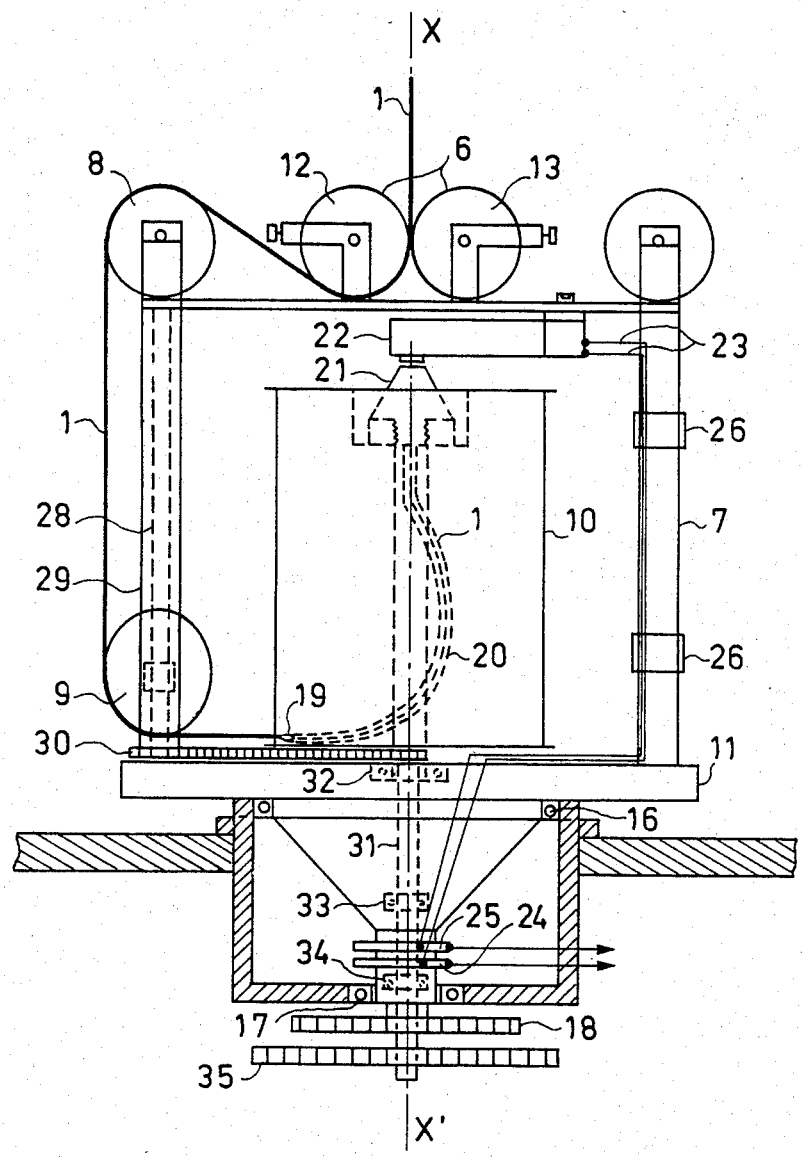
FIG. 4 a specific embodiment of the device according to the invention.

The drawn object can have a random cross-section and can be made from different materials, such as e.g. mineral or organic glass, plastic or metal.

Throughout the remainder of the description, reference will be made to a fibre, but this is in no way limitative. The invention will be better understood by referring to FIG. 1.

The invention makes it possible to consider the base of the drawing volume as fixed and it is generally a viscous cone from which the fibre is formed by any appropriate prior art means. This cone and the fibre being produced is then twisted by axial rotation of the actual fibre. The material source and the shaping means are not shown for simplification reasons.

Throughout the remainder of the description the production process using a blank will be considered, but this is in no way limitative and any other production process can be employed.

According to FIG. 1, fibre 1 is formed by simultaneous drawing and twisting from the drawing volume 2, the base 3 of the latter being subject to no angular movement. This base 3 is considered as a reference surface throughout the performance of the process according to the invention, and as in the prior art devices, the blank is displaced in the fibre drawing direction so as to be positioned within means making it possible to soften the end of the blank. These means can be heating means such as e.g. a furnace.

If the end of the fibre is twisted, the latter will deform and the torsion couple is transmitted from the end of the fibre to the drawing volume. Thus, it is possible to perform a predetermined number of turns on the length of the fibre. If the drawing volume was fixed and rigid, after a certain number of turns, the fibre would break having reached its elastic resistance limits. However, in this case the end of the drawing volume is a viscous cone, which produces a resistant couple when the torsion couple is applied to it. Thus, there is a balance between the torsion couple and the resistant viscous couple.

On continuing to twist the end of the fibre, the cone deforms and corkscrews by the number of turns applied to the end of the fibre. A fibre drawing movement takes place simultaneously with this rotational movement of the viscous cone. The desired result is that a certain number of twisting turns of the drawn fibre corresponds to a particular length thereof.

Thus, whilst bringing the procedure into equilibrium, there is an increase in the value of the torsion couple of the fibre and then only the viscous cone at the end of the drawing volume will undergo this torsion couple and will corkscrew.

At equilibrium the length of the fibre between the end of the fibre undergoing rotation and stretching and the viscous cone is stranded by the known number of turns, which is chosen to be constant and the viscous cone corkscrews under the effect of a constant couple. Thus, the fibre is stranded and drawn and is then simultaneously hardened to fix the high temperature state.

A device for twisting the fibre for retaining the circular polarization induced according to the process illustrated in FIG. 1 is diagrammatically shown in FIGS. 2 and 3. FIG. 2 is a side view of the device, the fibre being vertically drawn from top to bottom and is horizontally coiled within the non-limitative scope of this embodiment.

FIG. 3 is a projection view of the device along the drawing and rotation axis, viewed from the fibre formation side.

According to FIGS. 2 and 3, fibre 1 coming from the not shown shaping means is nipped in rollers 12 and 13 of holding device 6 between which it passes and is then deflected towards pulleys 8 and 9. Pulley 9 can undergo translation in order to ensure the transfer of the fibre to the vertically axes winding drum 10. The assembly of rollers of holding device 6 and guide pulleys 8 and 9 is integral with a plate 11, whose rotation axis XX' is vertical and conicides with the drawing axis XX' of fibre 1 on leaving the shaping means. The rotation axis of the drum also coincides with said axis XX'. This is the case which will be considered throughout the remainder of the description. However, it could differ in other types of construction. The rotation of the assembly formed by gantry 7 which supports the pulleys and rollers and plate 11 twists the fibre, whilst the rotation of drum 10 ensures drawing and winding.

Rollers 12 and 13 can be any other type of nipping or gripping device making it possible to draw the fibre. They can be covered with a coating of antislip material, such as an elastomer rubber, silicone, neoprene, etc., in order to ensure a good adhesion to the fibre. The guide pulleys 8 and 9 integral with the gantry in rotation make it possible to wind the fibre on to central drum 10.

If drum 10 and the assembly constituted by plate 11 and gantry 7 rotate at the same speed, fibre 1 is not wound on to drum 10. However, if drum 10 is kept stopped, one winding turn of fibre 1 on drum 10 corresponds to one twisting turn of fibre 1. However, the desired result is to obtain a large number of fibre turns per metre.

Furthermore, if plate 11 rotates at a speed $V_1$, it twists the fibre at the same angular speed. In order to be able to adjust the number of turns per metre of fibre produced, the speed $V_2$ of drum 10 is chosen which makes it possible to determine the winding speed $v = V_1 - V_2$ (or fibre formation speed if it is expressed linearly).

The means according to the invention make it possible to produce fibres with between 1 and 1000 twisting turns per metre. The fibre formation speeds can be regulated between 1 and 100 m/min.

It is possible to fix an appreciable part of the stresses, due to the shear by twisting, which produces an optical rotatory power in the fibre.

FIG. 4 is a diagram of a specific embodiment of the invention. The device comprises a plate 11 supporting a gantry 7, which holds a holding device for fibre 1 having at least two pulleys, of which elements 12 and 13 are shown. These two pulleys are provided with a spring pressing device having a regulatable pressure making it possible to centre fibre 1 in fibre formation axis XX'.

The fibre is returned by pulley 8 to pulley 9, which ensures the guidance on the receiving drum 10 concentric to plate 11 and the transfer by translation by means of a lead screw 28 located in vertical slide 29. Lead screw 28 is controlled by a notched belt 30, driven by a pulley transmission with an added reduction ratio, driven by the shaft of drum 10.

The motor shaft 31 guided by bearings 32, 33, 34, driven by pulley 35 ensures the rotation of drum 10 and lead screw 28. Plate 11 rotates on bearings 16 and 17 and is driven by pulley 18. Pulleys 35 and 18 are driven e.g. by a speed-regulated, direct current motor by means of two notched belt and pulley transmissions with an adequate reduction ratio, which are not shown in the drawing.

The receiving drum 10 has a fibre guidance device constituted by an opening 19, a tube 20 and a hub 21, whose shaft is perforated so that the fibre can reach photodetector 22 fixed to gantry 7.

In certain fibre production devices, such as the blank, there is an emission spectrum at the furnace making it possible to monitor the light level at the end of the fibre. Thus, it is possible to position at this point a photodetector 22 which can, for example, be a photomultiplier.

Photodetector 22 makes it possible to check the light level transmitted by the fibre during production in order to detect a possible accident in the case of e.g. a melting process, where the blank or molten glass emits light. Thus, if a bubble is formed in the fibre, there would be a discontinuity in the light intensity variation.

The electrical connections 23 supply power to the photodetector and collect therefrom information via revolving contacts 24, 25.

The dynamic balancing of the machine is ensured by weights 26 and is greatly facilitated by the coaxial design of drum 10, plate 11 and gantry 7. Thus, there is a rotational self-balancing system.

In order to regulate the speeds $V_1$ of drum 10 and $V_2$ of the plate 11-gantry 7 assembly, together with the transfer pitch, adjustments are carried out on the reduction ratios of the drive pulleys. However, it would also be possible to control each of these three systems by separate control circuits.

It is obvious that all the prior art fibre production means can be disposed along the fibre drawing axis between the drawing volume and the gripping rollers. In this way it is possible to introduce a fibre coating device for covering it with a protective coating.

However, in this case the resistant couple introduced at the device must not exceed the torsion couple of the fibre. Thus, said torsion couple must act at the viscous cone of the drawing volume, otherwise the fibre would be corkscrewed up to the coating only and a stranded fibre would not be obtained.

In the device according to the invention, there is no torsion or twisting over and beyond that required and it constitutes a winding without torsion.

It is of interest to regulate the diameter of the fibre, if not any defect in the blank diameter will lead to a diameter defect in the fibre. A fibre diameter transducer or sensor is then located at the outlet from the furnace where the fibre is bare, i.e. it has not then been given a protective coating. A signal is then obtained, which is proportional to the fibre diameter and this is used for regulating the glass flow on leaving the furnace, by regulating the fibre formation rate. Without this, the glass flow on entering the furnace would not be equal to the glass flow on leaving it and the fibre would be subject to diameter fluctuations directly proportional to the diameter variations of the blank.

As a function of the choice of the fibre twisting direction, at the time of its production, a left-hand or right-hand rotatory power of the polarization is obtained.

The thus obtained fibres can be used in the production of optical fibre transducers of various types, e.g. current transducers.

What is claimed is:

1. A device for providing a drawn fiber-like object with a helical structure, said device comprising:
    means for providing a softened material source to be drawn into said object;
    a disk supported for rotational movement about a drawing axis for the drawing of said object;
    guiding means fixed and supported via a gantry which is fixed to said disk for guiding and passing the drawn object from a softened material source;
    gripping means for receiving said drawn object from said guiding means and gripping a solidified portion of the drawn object, said gripping means being supported by said gantry fixed to said disk for rotational movement around said drawing axis whereby rotation of said disk responsively subjects the drawn object to torsion in order to leave a residual stress state after hardening of the drawn object; and
    rotatable drawing and winding means for receiving said drawn object from said gripping means and thereby drawing the object from the softened material source along said drawing axis and for helically winding the thus drawn object around said drawing axis.

2. A device according to claim 1, wherein the drawing and winding means for drawing and winding the drawn object includes a drum having an axis of rotation coincident with the drawing axis of the drawn object.

3. A device according to claim 2, further comprising means for rotating the drum and the disk at different angular speeds.

4. A device according to claim 1, wherein the gripping means includes an antislip coating in contact with the drawn object.

5. A device according to claim 1, wherein the gripping means includes pulleys disposed on either side of and in contact with the drawn object.

6. A device according to claim 1, wherein the gripping means includes rollers disposed on either side of and in contact with the drawn object.

7. A device according to claim 1, wherein the guiding means includes plural pulleys on which the drawn object rests, one of the pulleys being a transfer pulley for winding the drawn object onto the drum.

8. A device according to claim 1, comprising a light-transmitting drawn object incorporating light detection means, which comprise a photodetector coupled to the end of the drawn object, the drum having an opening, a tube and a hub perforated in its axis so as to permit the end of the drawn object to be coupled to the photodetector integral with the gantry, and electrical connection means for supplying power to the photodetector and for collecting information from the photodetector via revolving contacts.

9. A device according to claim 1, wherein said gantry includes weights ensuring the dynamic balancing of the device.

10. A device according to claim 1, wherein the material source comprises means for providing a blank or preform.

11. A device according to claim 1, wherein the material source comprises at least one crucible containing the softened material.

12. A device according to claim 1, wherein the means for providing provides a source of material for an optical fiber.

* * * * *